United States Patent
Pang et al.

(10) Patent No.: US 8,462,625 B2
(45) Date of Patent: Jun. 11, 2013

(54) SYSTEM FOR ESTIMATING DOWNLOAD SPEED FROM PASSIVE MEASUREMENTS

(75) Inventors: Jeffrey Pang, Jersey City, NJ (US);
Karen Barnes, South Burlington, VT (US); Dinesh Chachidhanandam, Hackettstown, NJ (US); Alexandre Gerber, Madison, NJ (US); Michael Salmon, Loganville, GA (US); Oliver Spatscheck, Randolph, NJ (US); Shobha Venkataraman, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 261 days.

(21) Appl. No.: 12/963,326

(22) Filed: Dec. 8, 2010

(65) Prior Publication Data
US 2012/0147758 A1    Jun. 14, 2012

(51) Int. Cl.
*G06F 15/16*    (2006.01)
*G06F 11/00*    (2006.01)

(52) U.S. Cl.
USPC .......................... 370/230; 370/252; 709/230

(58) Field of Classification Search
None
See application file for complete search history.

(56) References Cited

U.S. PATENT DOCUMENTS

| | | | | |
|---|---|---|---|---|
| 6,298,123 B1* | 10/2001 | Nolting et al. | ................ | 379/111 |
| 6,490,252 B1* | 12/2002 | Riggan et al. | ................ | 370/237 |
| 6,594,268 B1* | 7/2003 | Aukia et al. | ................ | 370/235 |
| 6,816,456 B1* | 11/2004 | Tse-Au | ................ | 370/230.1 |
| 7,006,472 B1* | 2/2006 | Immonen et al. | ................ | 370/332 |
| 7,013,342 B2* | 3/2006 | Riddle | ................ | 709/230 |
| 7,203,169 B1* | 4/2007 | Okholm et al. | ................ | 370/232 |
| 2003/0110276 A1* | 6/2003 | Riddle | ................ | 709/230 |

OTHER PUBLICATIONS

Gerber et al., Estimating Achievable Download Speed from Passive Measurements, Proceedings of Int'l Measurement Conf. (IMC) 2010, Nov. 2010, pp. 424-430, Melbourne, Australia.

* cited by examiner

*Primary Examiner* — Steven H Nguyen
(74) *Attorney, Agent, or Firm* — Akerman Senterfitt; Michael K. Dixon; Roy Zachariah (57) ABSTRACT

A system for passive estimation of throughput in an electronic network is disclosed. The system may include a plurality of mobile devices configured to operate in the network and may further include an electronic data processor. The processor may be configured to access flow records for data flows associated with the mobile devices during a predetermined time interval. Additionally, the processor may be configured to annotate the flow records with an application field and a content provider field. The processor may also be configured to determine a flow type of each data flow based on the application field and the content provider field of the flow records. Furthermore, the processor may be configured to generate a throughput index that only includes non-rate-limited flow types. Moreover, the processor may be configured to estimate maximum throughput for each data flow having non-rate-limited flow types in the throughput index.

20 Claims, 11 Drawing Sheets

| Flow type | C | L | % 1MB+ Flows | Throughput (norm) Median | Mean |
|---|---|---|---|---|---|
| (streaming, C1) | • | | 11.79 | 0.229 | 0.237 |
| (http other, C2) | | | 10.91 | 0.497 | 0.502 |
| (file download, C3) | | | 9.35 | 0.427 | 0.477 |
| (http other, C4) | • | • | 6.78 | 0.032 | 0.028 |
| (streaming, C5) | | | 6.36 | 0.539 | 0.559 |
| (p2p, C6) | • | • | 3.03 | 0.014 | 0.029 |
| (unknown, C7) | • | • | 2.80 | 0.009 | 0.027 |
| (email, C8) | • | | 1.19 | 0.056 | 0.116 |
| (web browsing, C4) | • | • | 0.95 | 0.032 | 0.026 |
| (streaming, C5) | | • | 0.92 | 0.266 | 0.328 |
| (http other, C9) | | | 0.90 | 0.566 | 0.576 |
| (email, C10) | • | | 0.80 | 0.147 | 0.175 |
| (web browsing, C2) | • | | 0.76 | 0.421 | 0.415 |
| (streaming, C4) | • | • | 0.75 | 0.025 | 0.028 |
| (email, C11) | • | | 0.61 | 0.072 | 0.155 |
| ... | | | | | |
| TI | | | 38.7 | 0.503 | 0.524 |

FIG. 6

|  | C | L | C+L | TI |
|---|---|---|---|---|
| % 1 MB+ Flows | 25.8 | 1.9 | 33.5 | 38.7 |
| % (application, content-provider) | 24.3 | 3.0 | 49.6 | 23.1 |

SYSTEM FOR ESTIMATING DOWNLOAD SPEED FROM PASSIVE MEASUREMENTS

FIELD OF THE INVENTION

The present application relates to throughput estimation techniques and, more particularly, to a system for estimating download speed from passive measurements.

BACKGROUND

An achievable throughput at which users may download or access different types of content at various locations and times is a very important metric to service providers. Being privy to such knowledge enables the services providers to more effectively provision additional capacity in a particular region of a network of the service provider and/or at particular times in the network. Currently, a variety of different methods and systems exist for measuring download rates and/or throughput in a network. For example, current techniques for measuring throughput involve periodically downloading large files from a number of active probes while measuring their achieved throughput. However, such a test places substantial loads on the network being examined, may not necessarily represent the actual experiences that users undergo, and are often expensive to deploy and maintain. Accordingly, such active tests often are not representative of a portion of a network, and in particular, a wireless network.

SUMMARY

A system for passive estimation of throughput in a network is disclosed. The system may be configured to analyze data flows associated with one or more devices operable in a network. In particular, the system may be configured to collect and examine flow records for the data flows and annotate the flow records with application and content provider fields. The system may then be configured to determine a flow type of each data flow based on the application field and the content provider field of the flow record. After the flow types have been determined for the data flows, the system may generate a throughput index which may include non-rate-limited flow types. The system may then provide throughput estimates for the data flows having non-rate-limited flow types in the throughput index.

In one embodiment, the system may include an electronic data processor which may be configured to access a flow record for each data flow of a plurality of data flows during a predetermined time interval. The plurality of data flows may be associated with a plurality of computing devices. The electronic data processor may also be configured to annotate the flow record for each data flow with an application field and a content provider field. The application field may indicate an application protocol, and the content provider field may indicate a content provider with which each data flow is in communication. Additionally, the electronic data processor may be configured to determine a flow type of each data flow based on the application field and the content provider field of the flow record. Furthermore, the electronic data processor may be configured to generate a throughput index, which includes the flow type of each data flow only if the flow type is determined to be a non-rate-limited flow type. Once the throughput index is generated, the electronic data processor may be configured to estimate an average maximum throughput for each data flow having the non-rate-limited flow type in the throughput index.

In another embodiment, a method for passive estimation of throughput in a network may be provided. The method may include collecting a flow record for each data flow of a plurality of data flows during a predetermined time interval. The plurality of data flows may be associated with computing devices in the network. The method may also include annotating the flow record for each data flow with an application field and a content provider field. The application field may indicate an application protocol, and the content provider field may indicate a content provider with which each data flow is in communication. Additionally, the method may include determining a flow type of each data flow based on the application field and the content provider field of the flow record. Flow types may include, but are not limited to including, a rate-capped flow type, a partially rate-limited flow type, and a non-rate-limited flow type. The method may also include generating a throughput index. The throughput index may include the flow type of each data flow if the flow type is determined to be the non-rate-limited flow type. Furthermore, the method may include selecting each data flow having the flow type in the throughput index and estimating an average maximum throughput for each data flow selected.

According to another exemplary embodiment, a computer-readable medium comprising instructions for defending against internet-based attacks may be provided. The computer instructions when loaded and executed by an electronic processor, may cause the electronic processor to perform activities including the following: annotating a flow record for each data flow of a plurality of data flows with an application field an a content provider field, wherein the application field indicates an application protocol and the content provider field indicates a content provider each data flow is communicating with, and wherein the plurality of data flows are associated with computing devices in a network; determining a flow type of each data flow based on the application field and the content provider field of the flow record; generating a throughput index, wherein the throughput index comprises the flow type of each data flow only if the flow type is determined to be a non-rate-limited flow type; selecting each data flow having the non-rate-limited flow type in the throughput index; and estimating an average maximum throughput for each data flow selected.

These and other features of the passive measurement system are described in the following detailed description, drawings, and appended claims.

DETAILED DESCRIPTION OF THE INVENTION

The exemplary embodiments of the present disclosure are described with respect to systems and methods for estimation of throughput in a network. The system may be utilized to effectively estimate throughput in a network by utilizing passive measurements rather than using active measuring utilities. The system may be configured to examine data flows associated with one or more devices in a communications network. Also, the system may be configured to access flow records for the data flows and flag or mark the flow records with application and content provider fields. The contents of the application field and the content provider field of the flow record may be utilized by the system to determine a flow type of each data flow. Once the flow types have been determined for the each of data flows, the system may construct a throughput index that may include flow types of each data flow that are determined to have non-rate-limited or non-rate-capped flow types. Accordingly, the system may then provide throughput estimates for the data flows having non-rate-limited or non-rate-capped flow types in the throughput index. The exemplary embodiments can be applied to other types of systems and methods.

Figure 1:
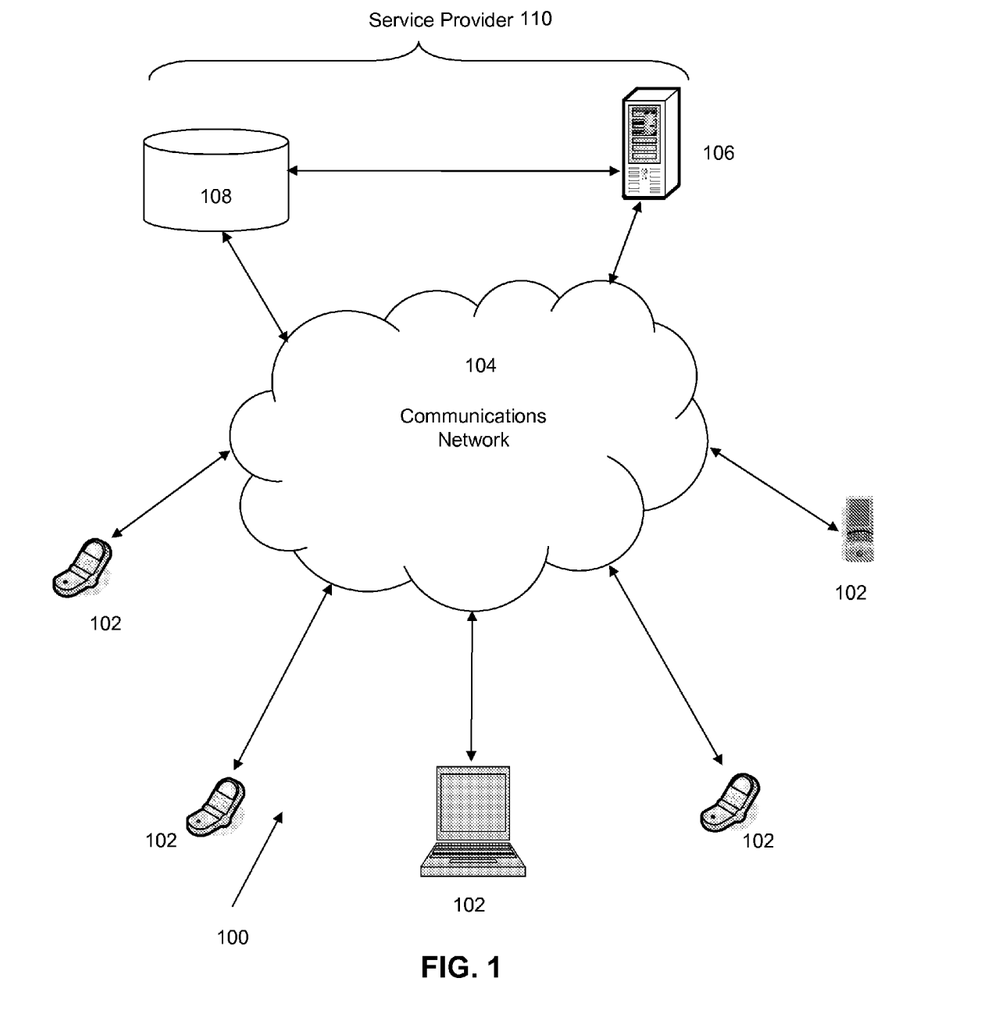
FIG. 1 is a schematic view of a system providing passive estimation of throughput in a network according to an embodiment of the present invention.

Referring to the drawings and in particular FIG. 1, an exemplary system 100 for passive estimation of throughput in a network is schematically illustrated. Maximum throughput may be defined as the achievable throughput of a stead-state flow (such as a TCP flow) at a given time and location in the network, however, other definitions are also contemplated. The system 100 may include one or more computing devices 102. The computing devices 102 may include devices such as, but not limited to, a computer, an electronic processor, a hand-held device, a personal digital assistant, a mobile device, a cellular phone, a smart phone, a communications device, a router, a server, and other devices. For example, the computing devices 102 may be HSDPA category six devices, which may be able to reach 3.6 Mbps in the download direction. In an embodiment according to the present disclosure, the aforementioned devices may be utilized in conjunction with one another. Additionally, the system 100 may include a communications network 104, which may include, but is not limited to including, a wireless network, an ethernet network, a satellite network, a broadband network, a cellular network, a private network, a cable network, an interactive television network, the Internet, or any other suitable network. In one embodiment, the communications network 104 is a wireless network, such as a 3 G wireless network.

The system 100 may also include an electronic data processor 106, which may be configured to perform various calculations and operations to provide the passive estimates. The electronic data processor 106 may be incorporated into various types of computing devices such as, but not limited to, a server, a desktop computer, a laptop computer, a mobile device, a personal digital assistant, a hand-held device, a router, a switch, and/or other types of computing devices. Furthermore, the system 100 may include a database 108, which may be configured to store various types of data and information traversing the communications network 104 or otherwise. Both the electronic data processor 106 and the database 108 may be devices associated with a service provider 110. The electronic data processor 106 and the database 108 may be configured to communicate with one another, the communications network 104, and the computing devices 102. Also, the service provider 110 may control the communications network 104 and control the various computing devices' 102 access to the communications network 104.

Notably, the system 100 may be configured to estimate maximum throughput by using passively measured flow records. Specifically, the system 100 may be configured to collect, examine, or both collect and examine, all given flow records, such as TCP flow records, that traverse communications network 104 during a predetermined time interval and output an estimate of the average maximum throughput over the predetermined time interval when downloading content from a non-rate-limited internet source provider. In operation, the electronic data processor 106 may be configured to collect a flow record for each data flow occurring in the system 100 during a predetermined time interval. For example, a flow record may be collected for each flow every minute or another time interval. The data flows may be flows that are either intended for the computing devices 102 or flows that are transmitted from the computing devices 102. Also, the processor 106 may also collect the flow records for a certain percentage of users in the communications network 104, such as three percent of the users in the communications network 104. The flow records may optionally be stored in database 108 of the service provider 110. In one embodiment, each data flow occurring in the communications network 104 may be distinguished from another data flow by a tuple. As an illustration, the distinguishing tuple may be a standard (ipsrc, ipdst, sport, dport) tuple or other appropriate tuple. Each flow record may be annotated with an application field and a content provider field and the annotation may be performed by the electronic data processor 106.

The application field may indicate or correlate to an application protocol utilized in the data flow that the flow record is associated with. On the other hand, the content provider field may indicate a service/content provider that the particular data flow is communicating with. In one embodiment, the application field may be based on application headers and port numbers. In another embodiment, the content provider field may be identified by an HTTP Content-Provider header, other header, or a domain name service name of a server associated with the content provider. In yet another embodiment, the flow record may be further annotated with additional fields/statistics. For example, the electronic data processor 106 may annotate the flow record with a bytes field. The bytes field may be utilized to indicate a volume of data that is transferred during the predetermined time interval. The electronic data processor 106 may also annotate the flow record with duration and total bytes fields. The duration field may indicate a time interval between the first and last packets for a particular data flow and the total bytes field may indicate a volume of data transferred since the data flow was initiated. In an embodiment, the flow records may be configured to include no personally identifying information.

Rather than merely applying a summary function over byte/duration values in all flow records (e.g. the mean of the values), the electronic data processor 106 may be configured to analyze and take into account the data flow size, the application protocol, and the content provider when providing the estimate of throughput. With regard to data flow size, the electronic data processor 106 may be configured to determine whether each data flow of the data flows occurring in the communications network 104 has the minimum flow size required to achieve a steady-state throughput. As an illustration, often times a significant number of bytes of a particular data flow may be transferred before achieving a steady-state throughput. Such as scenario may occur when the data flow transfer is beginning and the data flow initiates in a slow-start phase that gradually checks for available capacity in the network. Accordingly, the electronic data processor may be configured to determine a flow size that enables the majority of data flows in the communications network 104 to exit a phase such as a slow-start phase. By determining the flow size to exit such a phase and only including those data flows having such a flow size, the estimations provided by the electronic data processor 106 may be more indicative of the maximum throughput.

Figure 2:
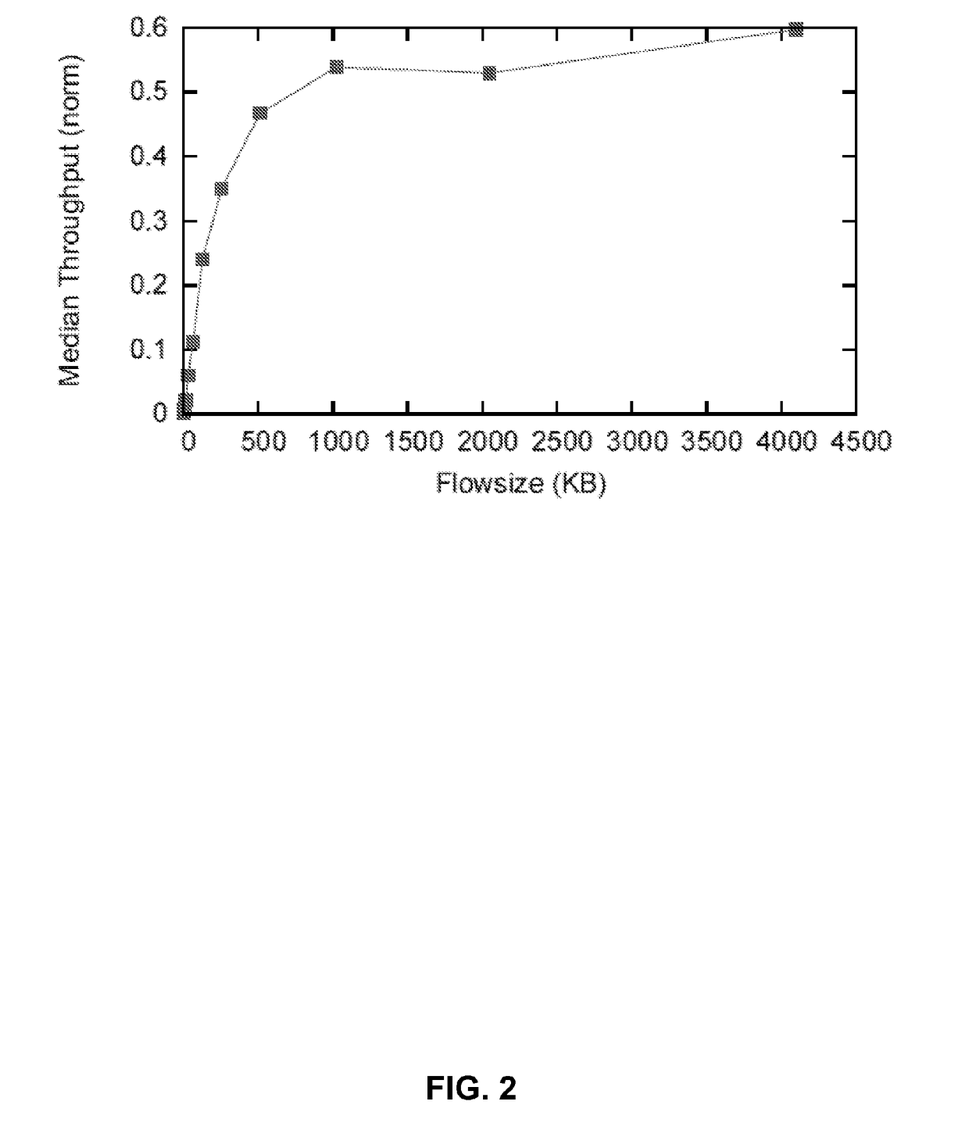
FIG. 2 is a graph illustrating median normalized throughput of non-rate-limited data flow records versus data flow size.

FIG. 2 features a graph illustrating median normalized throughput of non-rate-limited flow records versus flow size is schematically illustrated. In this example, all flow records with size $2^i \leq$ total bytes $<2^{i+1}$ are aggregated in the bin $2^i$. Additionally, FIG. 2 illustrates that the median measured throughput, in this case somewhere between 0.5 and 0.6, of non-rate-limited flow records stabilizes at approximately one megabyte (1 MB). The electronic data processor 106 may utilize the bytes threshold at which the measured throughput stabilizes as a factor in its throughput estimations. For example, the electronic data processor 106 may exclude all data flows that do not include enough bytes to achieve stabilized throughput from the estimation calculations. Although the electronic data processor 106 may be configured to execute and perform a summary function over the byte/duration values in all flow records that have a total bytes value greater than or equal to the throughput stabilization threshold (in this case 1 MB), such a function may not be sufficient since measured throughput of identically sized large flows may still vary based on the application protocol utilized and the content-provider utilized.

Figure 3:
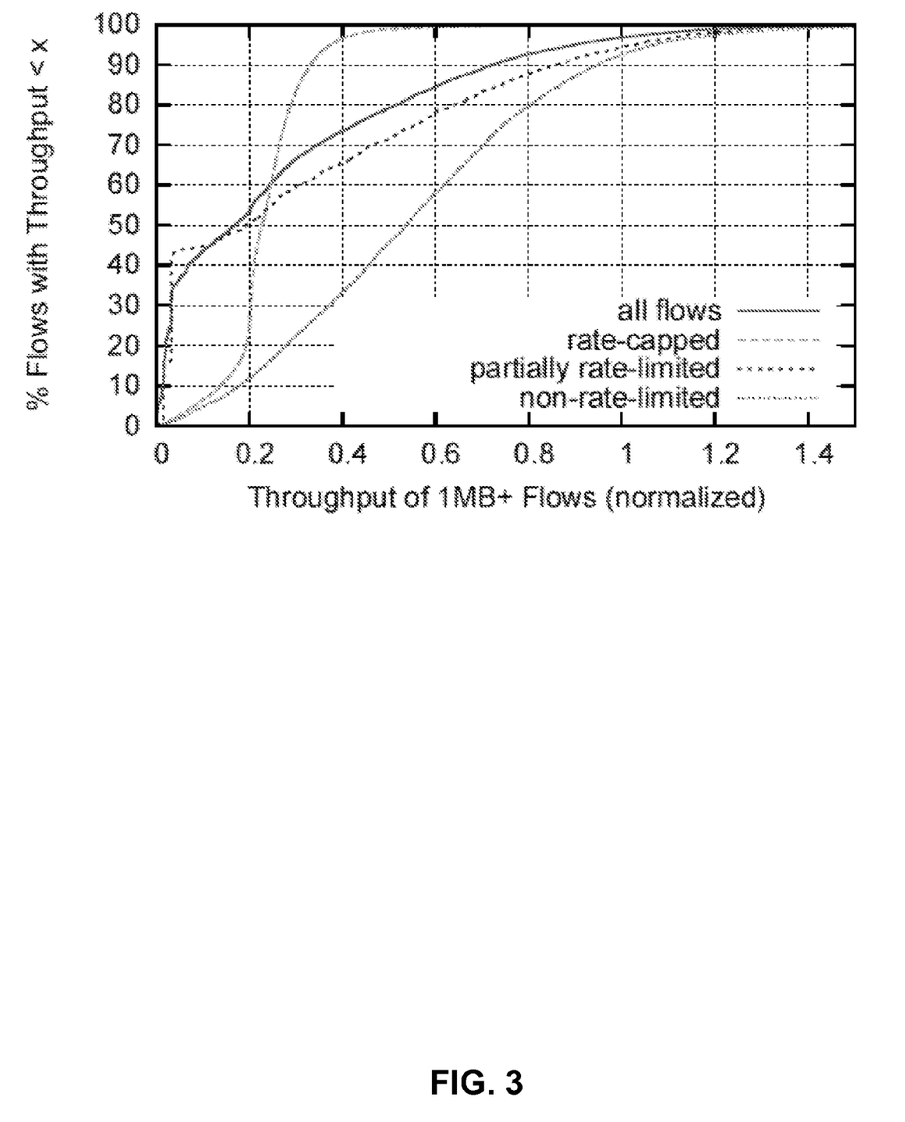
FIG. 3 is a line graph featuring a distribution of measured throughput values over flows greater than or equal to one megabyte for several flow types.

As an illustration, and referring now also to FIG. 3, a line graph featuring a distribution of measured throughput values over 1 MB plus flows for several (application, content-provider) flow types is schematically illustrated. Specifically, FIG. 3 illustrates graphs for rate-capped flow types, partially rate-limited flow types, non-rate-limited flow types, and a cumulative graph for all of the flow types. Flows having rate-capped flow types may be capped at a particular throughput by a content provider associated with the flows, and may not reach a maximum possible throughput. In particular, rate-capped flow types may be flow types that never reach the available capacity of the network. Flows may also appear to be rate-capped based on traffic shaping by the content provider, application protocol bottlenecks, and/or congestion/capacity issues. Non-rate-limited flow types may be flow types that are not capped by a content provider or are not otherwise rate limited. Data flows having a partially-rate-limited flow type may be rate-limited in some throughput ranges and non-rate-limited in other throughput ranges. In particular, partially-rate-limited flow types may be defined as those flow types having a significant fraction of rate-limited flows. As FIG. 3 illustrates, the rate-capped flow type depicts a bottleneck or a rate-limitation by the content provider since none of the flows reach the higher possible throughputs, as illustrated in the tail of the all flows types line. In contrast, the non-rate-limited flow type is illustrated in FIG. 3 as having throughput values across the possible spectrum of throughputs. The partially-rate-limited flow type in FIG. 3 depicts the bimodal nature of the flow type. Specifically, the partially rate-limited flow type is rate-limited between 0-40% and non-rate-limited between 40-100% ranges. Accordingly, the electronic data processor 106 may be configured to incorporate other factors in performing the estimations.

Figure 4:
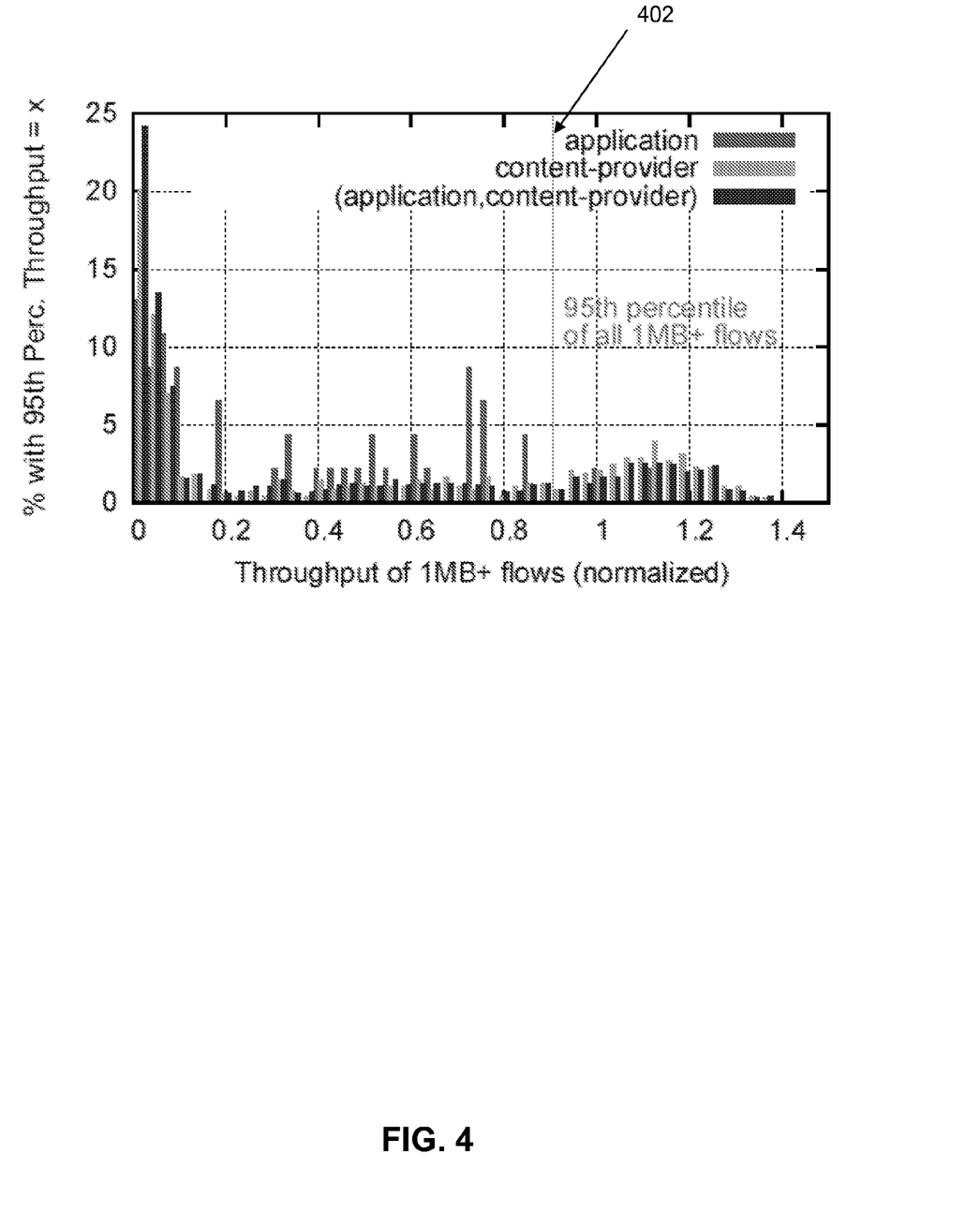
FIG. 4 is a histogram of the $95^{th}$ percentile of throughput from each application, content-provider, and application/content provider flow type.

In order to provide a more accurate estimate of maximum throughput for the data flows, the electronic data processor 106 may be configured to filter out applications and content providers that have flow distributions that are similar to the rate-capped flow types and partially-rate-limited flow types. In FIG. 3, in order to identify rate-capped flows, it is noted that the rate-capped flow distribution does not cross the tail of the all flows distribution. As an example, if it may be assumed that at least five percent of all 1 MB plus flows reach the available capacity of the communications network 104, then a non-rate-capped or non-rate-limited flow type may have a $95^{th}$ percentile throughput at least as large as the $95^{th}$ percentile throughput of all 1 MB plus data flows since all 1 MB plus flows may include both rate-limited and non-rate-limited flow records. Referring now also to FIG. 4, a histogram of the $95^{th}$ percentile of throughput from each application, content-provider, and application/content provider flow type respectively is schematically illustrated. The flow types may be defined by application only, content provider only, and as a application/content provider pair.

FIG. 4 illustrates that for the content provider and application/content provider combination, there is a mode to the right of the line 402 (the "$95^{th}$ percentile of all 1 MB plus flows line). The mode to the right of the line 402 represents flows having non-rate-limited/non-rate-capped flow types. The distribution for applications does not have such a mode. This may suggest that rate-capping is done primarily by content providers instead of application protocols. Flow types to the left of the line 402 may be classified as being rate-capped. As noted above, partially rate-limited flows have a bimodal nature which includes a distribution having rate-limited and non-rate-limited portions. Such changes in the distribution may be observed by examining a flow type's cumulative distribution function (CDF) slope. A heuristic as follows may be utilized: Let $s_i$ and $s_{i+5}$ be the slopes at percentile i and i+5 respectively. The slope ratio of $s_i$, and $s_{i+5}$ may be $s_i/s_{i+5}$. The maximum slope ratio may be defined as the greatest slope ratio over i $\in$[7, 8, 9 . . . 93] (the top and bottom percentiles may be ignored to guard against outliers). The maximum slope ratio will be large if there is a dramatic decrease in slope within any five percentile range. In practice, $s_i$ may be approximated as the difference between percentile (i−2.5) and percentile (i+2.5).

Figure 5:
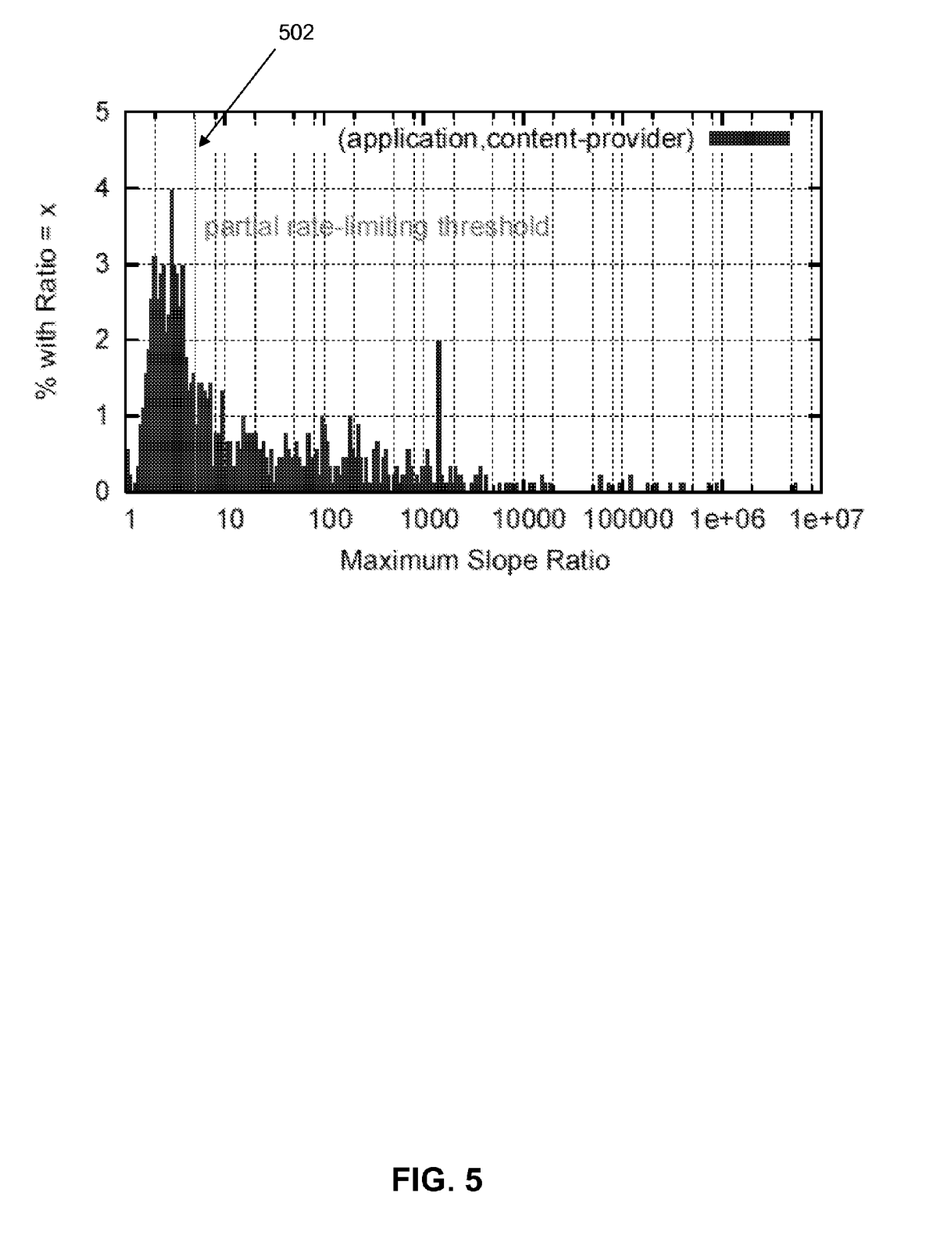
FIG. 5 is a histogram which illustrates maximum slope ratio of each application/content provider flow type.

Additionally, FIG. 5 illustrates a histogram which illustrates maximum slope ratio of each (application, content provider) flow type. The maximum slope ratio may be computed and depicted on the histogram using a logarithmic scale. FIG. 5 illustrates only flow types having at least 100 flow records. A primary mode to the left of the line 502 at maximum slope ratio equals five is shown. This primary mode may represent flow types that do not have dramatic changes in slope. However, a long tail is pictured to the right of the line 502. Flow types to the left of the partially rate-limiting threshold line 502 may be identified as partially rate-limited. Utilizing a partially rate-limiting threshold equal to five may capture the majority of flow types in the main mode.

Figure 6:
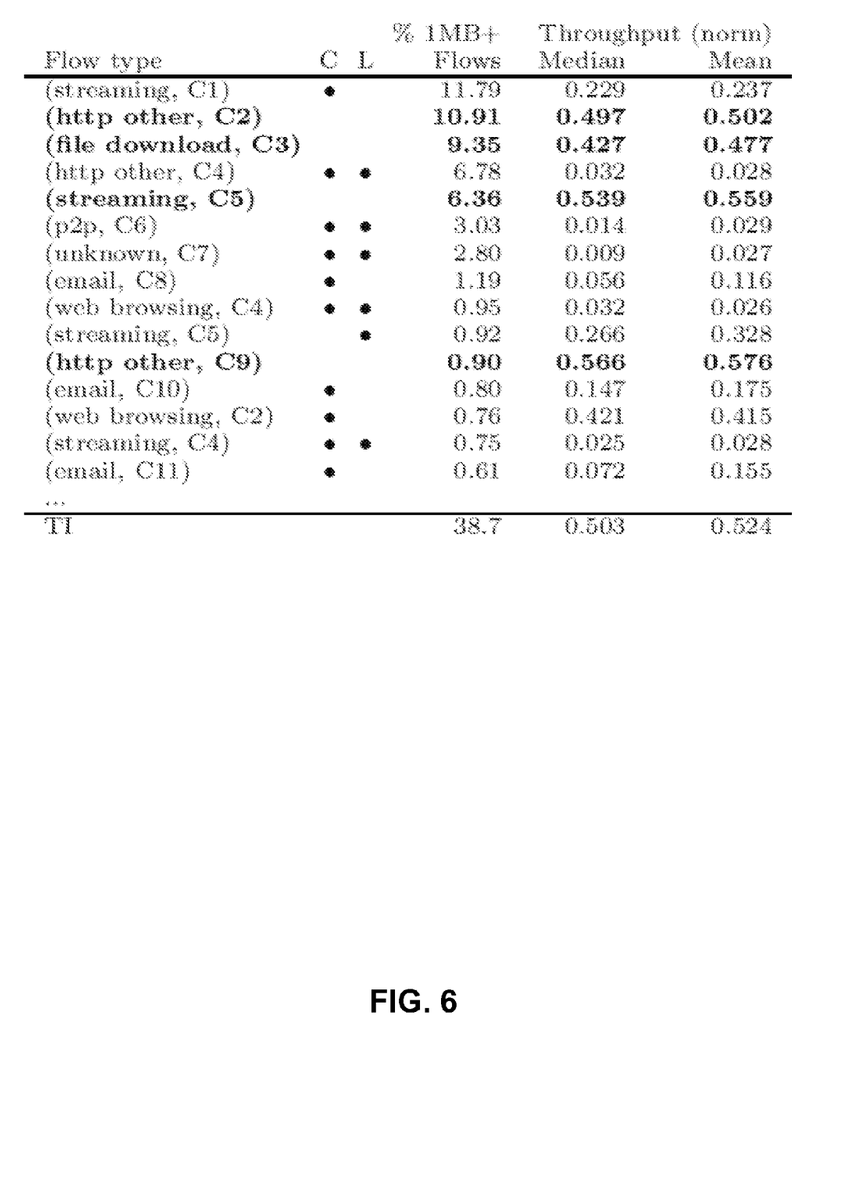
FIG. 6 is a table illustrating flow types, the percentage of one megabyte plus flows of each flow type, and the normalized median and mean throughputs of their one megabyte plus flows.

In light of the above, the electronic data processor 106 may be configured to determine the flow types of each data flow based on the application field and the content provider field of the flow record. Upon determining the flow types of the data flows, the electronic data processor 106 may be configured to generate/construct a throughput index. The throughput index may be utilized to filter out all flow types which are not non-rate-limited or non-rate-capped flow types. In other words, the throughput index may be configured to include only those flow types which are non-rate-limited or non-rate-capped. FIG. 6 illustrates a table featuring the top fifteen flow types by number of 1 MB plus flows, whether they are identified as rate capped (C) and/or partially rate-limited (L), and their corresponding mean and median throughputs. Entries selected in bold are entered into the throughput index generated by the electronic data processor 106 because they are either non-rate-limited or non-rate-capped flow types. As noted in the table of FIG. 6, the non-rate-limited or non-rate-capped flow types' mean and median throughputs are much closer in value than rate-capped or partially rate-limited flow types.

Figure 7:
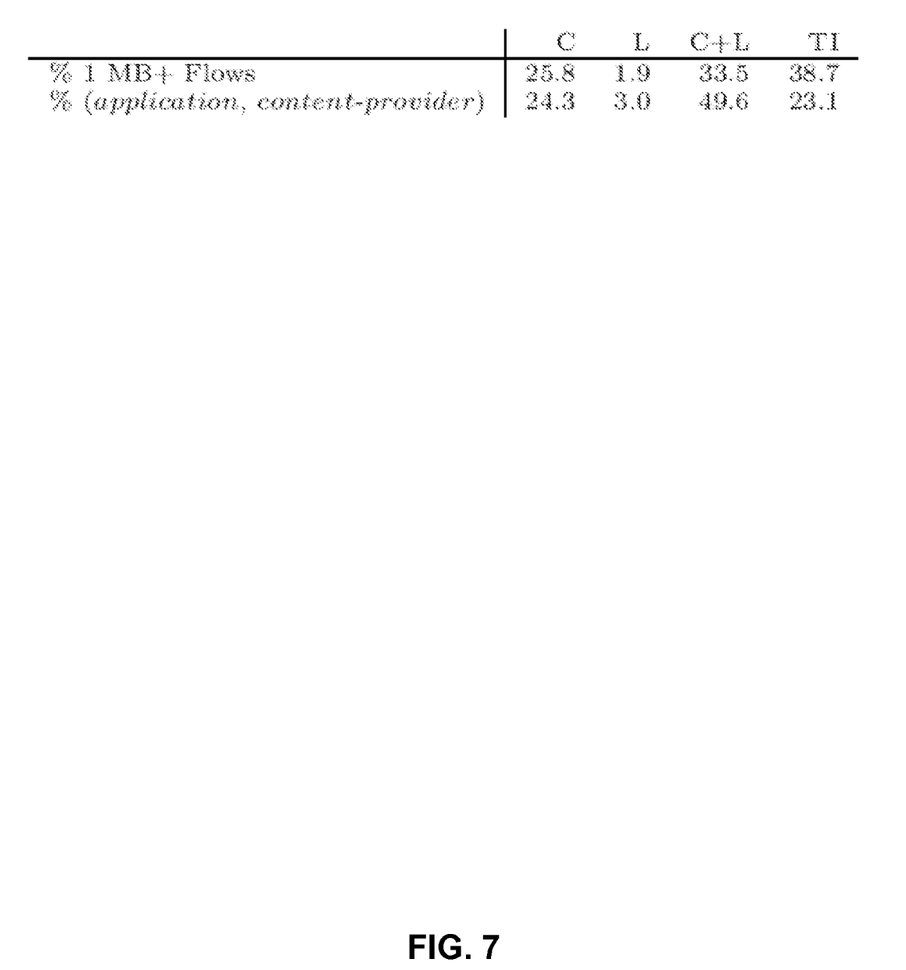
FIG. 7 is a table illustrating the percent of flows and application/content provider types that are rate-capped, partially rate-limited, and both rate-capped and partially rate-limited, along with the percent of flow types utilized in a throughput index.

Notably, the electronic data processor 106 may determine the flow types of each data flow based on both the application field and the content provider field rather than based on the fields individually, because some content providers may have both non-rate-limited and rate-limited applications. Such as a scenario is depicted by content providers C2 and C5 of FIG. 6. FIG. 7 illustrates the percentage of flows and flow types in each flow type category. Specifically, FIG. 7 indicates that nearly 60% of large flows are rate-capped and are thus unable to reach maximum throughput capacity of the communications network 104. Additionally, FIG. 7 indicates that 38.7% of 1 MB plus flows and 23.1% of flow types. As noted above, the throughput index may be utilized to filter out all flow types which are not non-rate-limited or non-rate-capped flow types. This enables the electronic data processor 106 to select only those data flows that are non-rate-limited or non-rate-capped for generating the maximum throughput estimations. In one embodiment, the throughput index may be recalculated by the electronic data processor 106 on a set or random time interval.

Upon using the throughput index as a filter to filter out the appropriate flows, the electronic data processor 106 may then proceed to estimate maximum throughput. The electronic data processor 106 may be configured to aggregate the byte/duration measurements of the flows in the throughput index. The aggregation may be performed using a plurality of methods. For example, one method (TI-F) may include taking a mean over the throughputs of all flow records in the throughput index. The aggregate resulting from this method may be robust to outlier users since it weights a very large number of flows from different users equally. This method may also be sensitive to non-network problems as well. A second method (TI-T) for aggregating the byte/duration measurements may include having the electronic data processor 106 compute the mean (average) of the means (averages) of each flow type in the throughput index. This second method weights each flow type equally so it is more robust to unexpected changes between individual content providers, however, it may be more sensitive to unpopular flow types that may be used infrequently. Either method, along with other methods, may be utilized by the processor to provide the estimations of maximum throughput.

Figure 8:
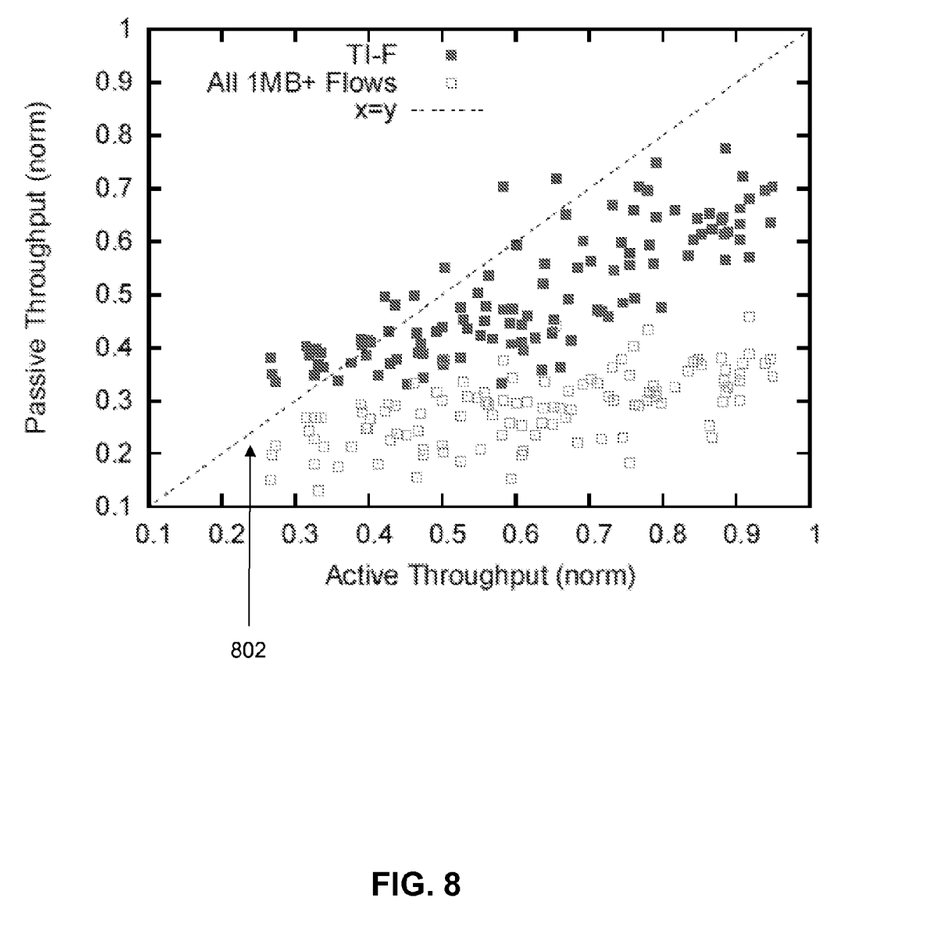
FIG. 8 is a scatter plot illustrating a comparison of active and passive estimates for a region.

In an embodiment, the electronic data processor 106 may be configured to validate or evaluate, or both validate and evaluate, the estimations of maximum throughput that were based on passively collected flow records to a set of active measurements, which may be retrieved from probes placed along various points in the communications network 104. In an example, each probe that is placed in the communications network 104 may be configured to perform a throughput measurement by downloading a file via an FTP from a server. The active maximum throughput estimate may be the mean of all measurements from all probes in the region of the communications network 104 that the probes are placed in. The passive maximum throughput measurements may be then compared to the active throughput measurements for a time interval during similar time periods. FIG. 8 illustrates a scatter plot illustrating such a comparison between active and passive throughput estimates. Each point may represent the estimate for one hour in the largest region of the communications network 104. When the passive and active estimates have the same value, then the corresponding points fall on the x=y line 802. Upon further inspection of FIG. 8, it may be seen that the all 1 MB plus flows approach produces estimates that are significantly less than the active measurements. Taking the mean over the throughputs of all flow records (TI-F as shown in FIG. 8), produces estimates that are much closer, but are still generally less. This may be explained by the fact that some flows in the throughput index may still be rate-limited by application behaviours that are not detected. It may also be explained by the fact that active measurement probes may be in higher quality vantage points (i.e. better radio frequency conditions) than most typical real users.

Figure 9:
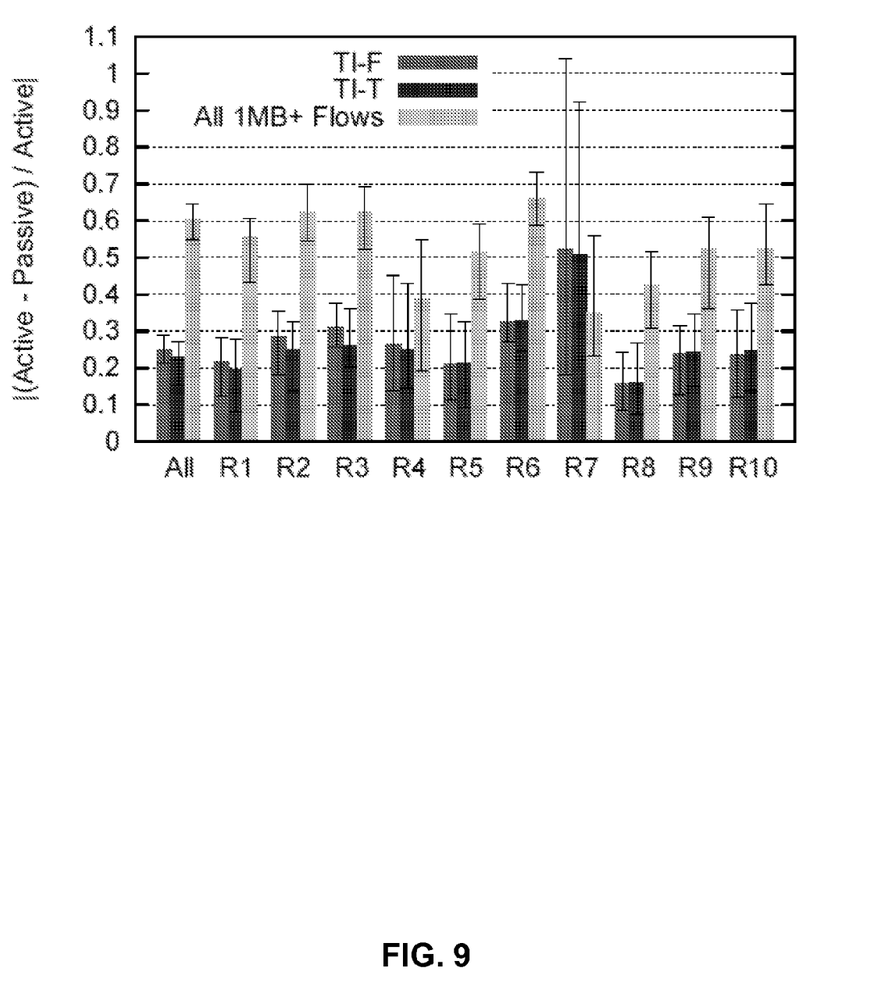
FIG. 9 is a histogram illustrating the relative difference of passive estimates to active estimates in multiple regions.
Figure 10:
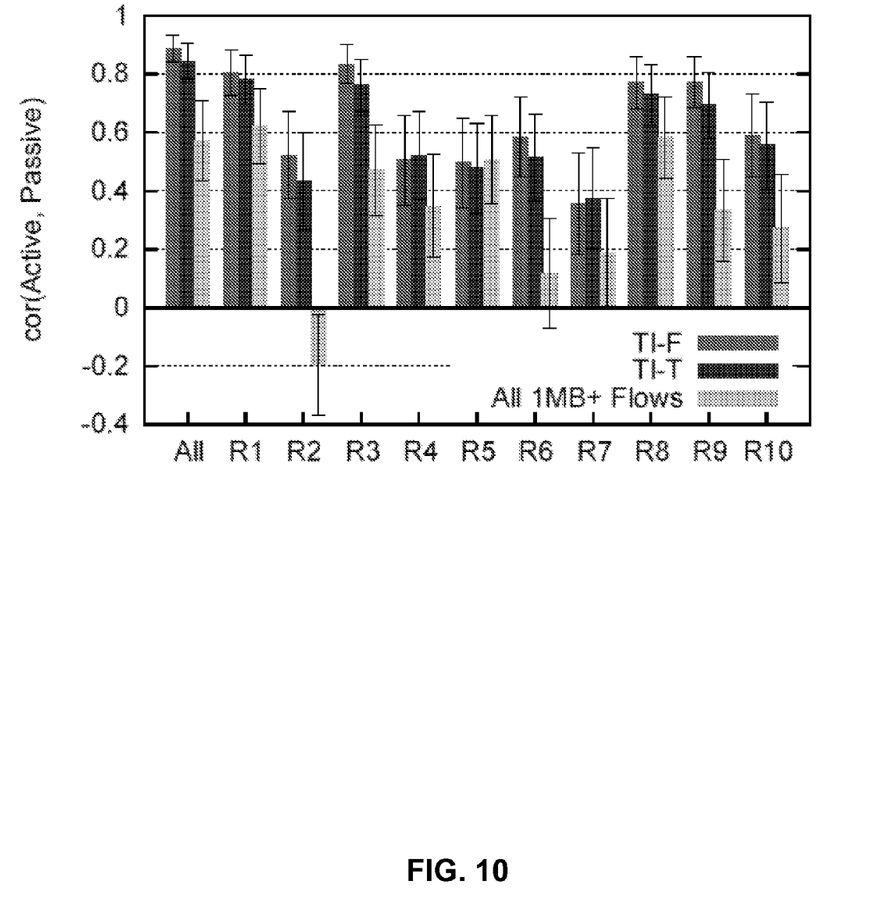
FIG. 10 is a histogram illustrating the correlation of passive estimates to active throughput estimates in multiple regions.

In one embodiment, the electronic data processor 106 may be configured to compare the relative difference between the passive estimates and active estimates in other regions. FIG. 9 features a comparison of the relative difference between each set of passive and active estimates for all regions, along with the ten regions with the most active probe vantage points. As illustrated, the top of each bar in FIG. 9 may be configured to indicate the median relative difference (over all the hours) and the errors bars may show the $25^{th}$ and $75^{th}$ percentiles. Both methods of aggregation, TI-F and TI-T, are shown as having roughly the same relative difference over all the regions and both have relative differences substantially less than the All 1 MB plus flows approach. Additionally, it may be expected that when the active estimates decrease, the passive estimates may similarly decrease. FIG. 10 illustrates a Pearson's correlation coefficient between each passive estimate time series and the corresponding active estimate time series in all regions and in the top ten regions. The error bars illustrate 95% confidence intervals of the correlation coefficients and two perfectly correlated signals would have a correlation of one and any correlation greater than 0.6 may be considered to be well correlated. FIG. 10 illustrates that both methods for aggregation, TI-F and TI-T, are at least as correlated with the active estimates as the all 1 MB plus flows estimates.

Thus, the electronic data processor 106 may be configured to calculate maximum throughput for the data flows associated with computing devices 102 in the communications network 104 by utilizing passively collected flow records. Additionally, the electronic data processor 106 effectively utilizes a throughput index to filter out rate-capped and partially rate-limited flow types so as to provide estimations which correlate with active measurements. In one embodiment, the electronic data processor 106 may be further configured to adjust the predetermined time intervals used in collecting flow records and to estimate the average maximum throughput for each data flow having the non-rate-limited flow type at the adjusted predetermined time interval. Furthermore, in another embodiment, any estimates, throughput indices, or other data generated or accessed by the electronic data processor 106 may be stored in database 108.

Figure 11:
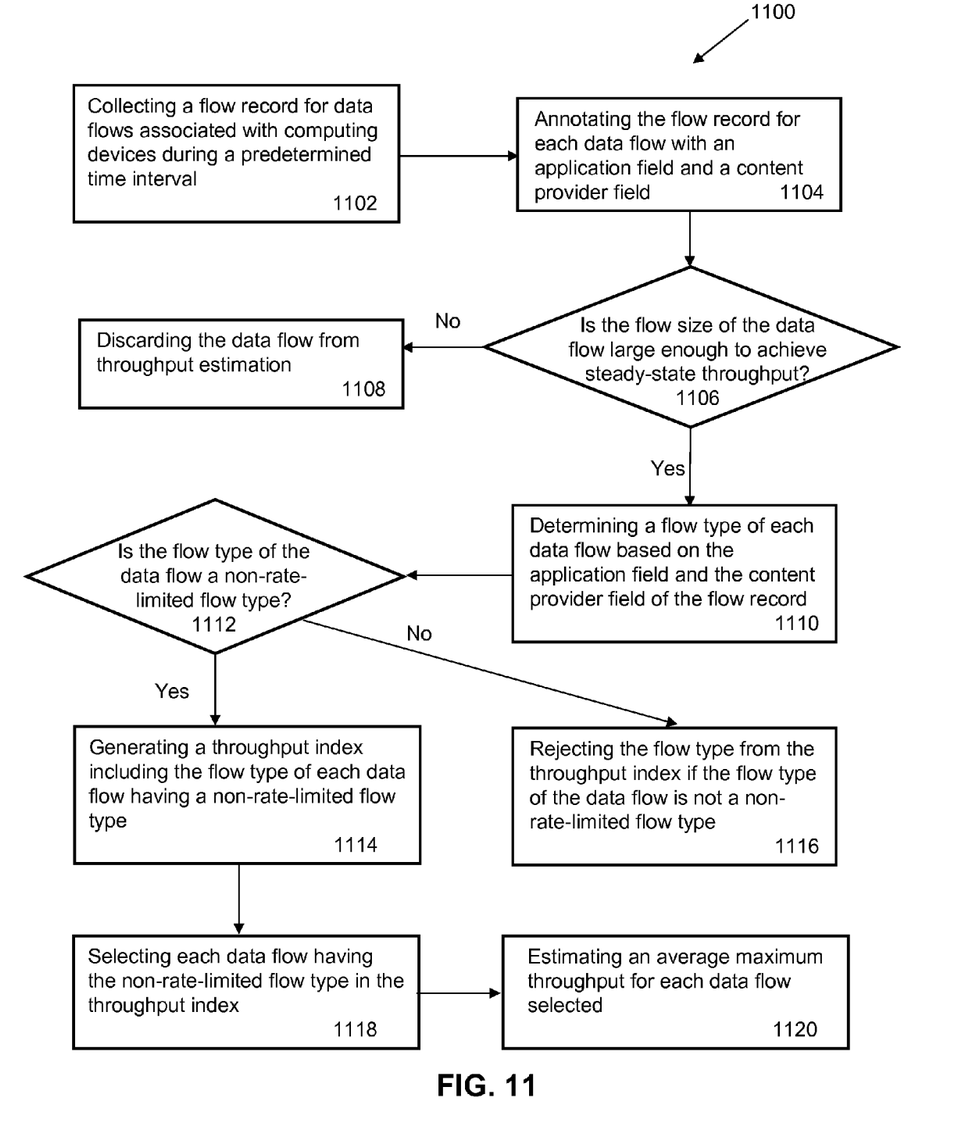
FIG. 11 depicts a passive measurement exemplary method for passive estimation of throughput in a network according to the system.

Referring now also to FIG. 11, an exemplary method 1100 for passive estimation of throughput in a network is depicted. The method 1100 may include, at step 1102, collecting a flow record for each data flow from a plurality of data flows during a predetermined time interval. The predetermined time interval, for example, may be once every minute, once every five minutes, or any other desired time interval. Each data flow of the plurality of data flows may be associated with one or more computing devices, such as those utilized in the systems described above. At step 1104, the method 1100 may include annotating the flow record for each data flow with an application field and a content provider field. As noted above, the application field may indicate an application protocol and the content provider field may indicate a content provider with which each data flow is communicating. Contents of the application field may be determined based on application headers and port numbers, and contents of the content provider field may be based on a header or a domain name service name of a server associated with the content provider. The flow records may be further annotated with a bytes field, a duration field, a total bytes field, among other fields. The bytes field may indicate a volume of data transferred during the predetermined time interval. The duration field may indicate a time interval between first and last packets of each data flow, and the total bytes field may indicate a volume of data transferred since each data flow was initiated.

At step 1106, the method 1100 may include determining if the flow size of each data flow is large enough for the flow to achieve a steady-state throughput. For example, the method may involve determine if enough bytes were transferred in the flow to exit a slow-start phase during transmission of the flow. If it is determined that the flow size of the data flow is not large enough to achieve steady-state throughput, the method 1100 may include discarding or excluding the data flow from the passive throughput estimations, at step 1108. However, in an embodiment, the method may include such data flows as well. If, however, it is determined that the flow size of the data flow is large enough to achieve steady-state throughput, the method 1100 may include determining a flow type of each data flow based on the annotated application field and the content provider field of the flow record, at step 1110. Flow types may include rate-capped flow types, partially rate-limited flow types, non-rate-limited flow types, non-rate-capped flow types, and other flow types.

At step 1112, the method 1100 may include determining if the flow type of the data flow is a non-rate-limited flow type or a non-rate-capped flow type. If the flow type of the data flow is determined to be a non-rate-limited flow type or a non-rate-capped flow type, the method 1100, at step 1114, may include generating a throughput index, which may be configured to include the flow type of each data flow determined to have either a non-rate-limited flow type or a non-rate-capped flow type. If, however, the flow type of the data flow is determined to be not a non-rate-limited flow type or not a non-rate-capped flow type (e.g. rate-capped flow type or partially rate-limited flow type), the method 1100 may include rejecting the flow type from being included in the throughput index at step 1116. At step 1118, the method 1100 may include selecting each data flow that is determined to have the non-rate-limited flow type or non-rate-capped flow type in the throughput index. Once the data flows are selected, the method 1100 may include estimating an average maximum throughput for each data flow selected. In an embodiment, the estimations may be performed using any of the techniques described in the present disclosure.

In an embodiment, the method 1100 may include filtering out a flow record and/or flow type if an analysis of either the application field or the content provider field indicates a flow distribution that is similar to a rate-capped flow type or a partially rate-limited flow type. In another embodiment, the method 1100 may include validating the average maximum throughput estimated for each data flow by comparing the average maximum throughput estimated to a set of active measurements measured in the network. For example, the estimates may be compared to active measurements recorded by one or more probes positioned along various locations in the network. Additionally, the method 1100 may include determining the average maximum throughput for each data flow both in the upload direction and the download direction. In one embodiment, the method 1100 may include distinguishing each flow from one the other by utilizing a tuple. As an illustration, the flows may be distinguished by using a (ipsrc, ipdst, sport, dport) tuple or other appropriate tuple. Furthermore, it is important to note that the methods described above may incorporate any of the functionality, devices, and/or features of the systems described above and are not intended to be limited to the description provided above.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

We claim:

1. A method for passive estimation of throughput in a network, the method comprising:

collecting a flow record for each data flow of a plurality of data flows during a predetermined time interval, wherein the plurality of data flows are associated with computing devices in the network;

annotating the flow record for each data flow to include an application field and a content provider field, wherein the application field indicates an application protocol and the content provider field indicates a content provider with which each data flow is in communication;

determining a flow type, by utilizing instructions from memory that are executed by a processor, for each data flow based on the application field and the content provider field of the flow record, wherein the flow type comprises one of a rate-capped flow type, a partially rate-limited flow type, and a non-rate-limited flow type;

generating a throughput index, wherein the throughput index comprises the flow type of each data flow if the flow type is determined to be the non-rate-limited flow type;

selecting each data flow having the flow type in the throughput index; and estimating an average maximum throughput for each data flow selected.

2. The method of claim 1, further comprising annotating the flow record with a bytes field, a duration field, and a total bytes field, wherein the bytes field indicates a volume of data transferred during the predetermined time interval, wherein the duration field indicates a time interval between first and last packets of each data flow, and wherein the total bytes field indicates a volume of data transferred since each data flow began.

3. The method of claim 1, further comprising determining whether each data flow of the plurality of data flows has a minimum flow size to achieve a steady-state throughput.

4. The method of claim 3, further comprising selecting each data flow having the flow type in the throughput index only if it is determined that each data flow has the minimum flow size to achieve the steady-state throughput.

5. The method of claim 1, further comprising generating measurements utilized in estimating the average maximum throughput for each data flow selected by dividing a quantity of bytes for each data flow transferred during the predetermined time interval by a time interval between first and last packets of each data flow.

6. The method of claim 1, further comprising aggregating the measurements utilized in estimating the average maximum throughput for each data flow selected to estimate a cumulative throughput.

7. The method of claim 1, further comprising removing the flow record from estimation calculations if an analysis of the application field or the content provider field of the flow record indicates a flow distribution similar to one of the rate-capped flow type or the partially rate-limited flow type.

8. The method of claim 1, further comprising validating the average maximum throughput estimated for each data flow selected by comparing the average maximum throughput to a set of active measurements measured in the network.

9. The method of claim 1, further comprising distinguishing each data flow of the plurality of data flows by utilizing a tuple.

10. The method of claim 1, wherein contents of the application field are determined based on application headers and port numbers, and wherein contents of the content provider field are based on a header or a domain name service name of a server associated with the content provider.

11. A system for passive estimation of throughput in a network, the system comprising:
a memory that stores instructions;
a processor that executes the instructions to perform operations, comprising:
  accessing a flow record for each data flow of a plurality of data flows during a predetermined time interval, wherein the plurality of data flows are associated with a plurality of computing devices;
  annotating the flow record for each data flow to include an application field and a content provider field, wherein the application field indicates an application protocol and the content provider field indicates a content provider with which each data flow is in communication;
  determining a flow type of each data flow based on the application field and the content provider field of the flow record;
  generating a throughput index, wherein the throughput index comprises the flow type of each data flow only if the flow type is determined to be a non-rate-limited flow type; and
  estimating an average maximum throughput for each data flow having the non-rate-limited flow type in the throughput index.

12. The system of claim 11, wherein the operations further comprise validating the average maximum throughput estimated for each data flow having the non-rate-limited flow type in the throughput index by comparing the average maximum throughput to a set of active measurements measured in the network.

13. The system of claim 11, wherein the operations further comprise adjusting the predetermined time interval and estimate the average maximum throughput for each data flow having the non-rate-limited flow type at the adjusted predetermined time interval.

14. The system of claim 11, wherein the operations further comprise determining whether each data flow of the plurality of data flows has a minimum flow size to achieve a steady-state throughput.

15. The system of claim 14, wherein the operations further comprise selecting each data flow having the non-rate-limited flow type in the throughput index only if it is determined that each data flow has the minimum flow size to achieve the steady-state throughput.

16. The system of claim 11, wherein the operations further comprise estimating the average maximum throughput for each data flow having the non-rate-limited flow type in the throughput index in an upload direction and a download direction for the plurality of computing devices separately.

17. The system of claim 11, wherein the operations further comprise generating measurements utilized in estimating the average maximum throughput for each data flow having the non-rate-limited flow type in the throughput index by dividing a quantity of bytes for each data flow transferred during the predetermined time interval by a time interval between first and last packets of each data flow.

18. A computer-readable device comprising instructions, which, when loaded and executed by a processor, cause the processor to perform operations comprising:
  annotating a flow record for each data flow of a plurality of data flows to include an application field and a content provider field, wherein the application field indicates an application protocol and the content provider field indicates a content provider with which each data flow is communication, and wherein the plurality of data flows are associated with computing devices in a network;
  determining a flow type of each data flow based on the application field and the content provider field of the flow record;
  generating a throughput index, wherein the throughput index comprises the flow type of each data flow only if the flow type is determined to be a non-rate-limited flow type;
  selecting each data flow having the non-rate-limited flow type in the throughput index; and
  estimating an average maximum throughput for each data flow selected.

19. The computer-readable device of claim 18, wherein the operations further comprise determining whether each data flow of the plurality of data flows has a minimum flow size to achieve a steady-state throughput, and selecting each data flow having the non-rate-limited flow type in the throughput index only if it is determined that each data flow has the minimum flow size to achieve the steady-state throughput.

20. The computer-readable device of claim 18, wherein the operations further comprise validating the average maximum throughput estimated for each data flow selected by comparing the average maximum throughput to a set of active measurements measured in the network.

* * * * *